United States Patent [19]

Furgerson

[11] Patent Number: 4,624,488
[45] Date of Patent: Nov. 25, 1986

[54] TUBULAR CONNECTION

[75] Inventor: David J. Furgerson, Kingwood, Tex.

[73] Assignee: Hydril Company, Los Angeles, Calif.

[21] Appl. No.: 562,448

[22] Filed: Dec. 16, 1983

[51] Int. Cl.$^4$ ............................................. F16L 15/00
[52] U.S. Cl. .................................... 285/334; 285/355; 285/390
[58] Field of Search ................ 285/333, 334, 355, 390

[56] References Cited

U.S. PATENT DOCUMENTS

| | | | |
|---|---|---|---|
| 1,832,141 | 11/1931 | Sheets | 285/334 |
| 2,258,066 | 10/1941 | Oyen | 285/334 |
| 2,636,753 | 4/1953 | Griffin | 285/334 |
| 2,825,585 | 3/1958 | Griffin | 285/333 |
| 3,359,013 | 12/1967 | Knox et al. | 285/334 |
| 3,870,351 | 3/1975 | Matsuki | 285/334 |
| 4,373,754 | 2/1983 | Bollfrass et al. | 285/334 |
| 4,377,302 | 3/1983 | Kohyama et al. | 285/390 |
| 4,384,737 | 5/1983 | Reusser | 285/334 |
| 4,410,204 | 10/1983 | Reimert | 285/27 |
| 4,433,862 | 2/1984 | Raulins et al. | 285/334 |
| 4,538,840 | 9/1985 | De Lange | 285/333 |

FOREIGN PATENT DOCUMENTS

| | | | |
|---|---|---|---|
| 1243605 | 7/1967 | Fed. Rep. of Germany | 285/333 |
| 2117469 | 10/1983 | United Kingdom | 285/355 |

OTHER PUBLICATIONS

Am. Petroleum Inst., "Drilling and Production Practice of 1949", copyright 1950, Author: Kelly, pp. 385, 387, 390.

Primary Examiner—Cornelius J. Husar
Assistant Examiner—Eric K. Nicholson
Attorney, Agent, or Firm—Dodge, Bush & Moseley

[57] ABSTRACT

An improved pin member adapted for use in a tubular connection where said pin member is adapted for coaxial threaded engagement with a box member having a counterbore for receiving the pin member. A pilot surface is disposed from a distal-proximate end to the distal end of the pin member inclining to a lesser extent than the angle of the incline of an internal sealing surface of the pin member. The pilot surface is substantially parallel to the axis of the connection. This pilot surface allows the end-of-pin flat thickness to be increased thereby allowing positioning of the interengaged threads so as to provide an increased radial thickness of the box member thereby increasing the axial tensile strength capability and burst pressure rating of said tubular connection while additionally protecting said internal surface of said pin member and providing a rugged end-of-pin flat. Additionally, a pilot surface is presented for the free end of a box member so as to provide additional protection of the external sealing surface of the box member and providing a more rugged end-of-box flat.

27 Claims, 3 Drawing Figures

TUBULAR CONNECTION

BACKGROUND OF THE INVENTION

1. Field of the Invention

This invention relates generally to the field of threaded connectors and in particular to threaded connectors for tubular goods having pin and box members.

2. Description of the Prior Art

The need for a threaded connector for tubular goods having an axial tensile capability substantially equal to that of the tubular goods has long been recognized. Additionally, increased burst pressure rating for the tubular goods has long been considered beneficial. By tubular goods it is to be understood that drill pipe, work tubing, production tubing, well casing and other such conduits used in a well are included. It is also to be understood that the use of the threaded connector of the present invention is not to be considered limited to such tubular goods.

In the design of tubular connections, critical boundary conditions must be considered, one of these boundary conditions being the requirement for a minimum thickness at the distal end or end-of-pin flat of the pin member in order to maintain ruggedness under manufacturing, transportation and field running and handling conditions. A geometry change at the end of the pin member that would increase the end-of-pin flat thickness would allow optimization of other critical performance features.

Current end-of-pin geometry restricts design optimization procedures and therefore restricts maximization of connection performance. Some commercially available tubular connections with current end-of-pin geometry are sold under the mark "Triple Seal" by the Hydril Company, the assignee of the present invention and application. Such "Triple Seal" connections have featured three positive metal-to-metal seals comprising a fourteen (14) degree external seal, a middle ninety (90) degree torque shoulder and seal and a fourteen (14) degree pin to box internal seal. The connections have been offered as two-step cylindrical threaded surfaces with modified buttress threads. A new generation of thread design sold under the marks, "Triple Seal II" or "MAC", also use the current end-of-pin geometry. The "Triple Seal II" or "MAC" designs also feature three positive metal-to-metal seals comprising fourteen (14) external seals, a middle shoulder and a fourteen (14) degree pin to box internal seal.

The end-of-pin geometry of the above mentioned designs requires that increased tensile strength and burst pressure rating be achieved by decreasing the pin radial thickness which therefore would allow an increase in the box radial thickness, but this would in turn present undesirable excessively thin end-of-pin flats. Also the current end-of-pin geometry does not offer optimal protection of internal and external sealing surfaces. Furthermore, the end-of-pin geometry of current designs is difficult to field repair without damaging the sealing surfaces.

IDENTIFICATION OF OBJECTS OF THE INVENTION

It is therefore, an important object of the present invention to provide an apparatus for an improved tubular connection which is not subject to the disadvantages discussed above.

It is another object of the invention to provide improved connection performance without violation of the end-of-pin boundary condition which requires a minimum thickness at the end of the pin in order to maintain ruggedness under field running and handling conditions.

It is a further object of the invention to provide increased axial tensile strength capability and burst pressure rating without violation of the end-of-pin boundary condition.

It is a further object of the invention to provide a new end-of-pin geometry that protects the internal sealing surface of the pin member.

It is a further object of the invention to provide end-of-pin geometry that is more easily repaired when damaged under field running and handling.

Still another object of the invention is to provide a pin member, as aforesaid, with a new end-of-pin geometry that improves the end-of-pin flat resistance to damage.

Furthermore, it is an object of the invention to provide a new end-of-box geometry which protects the external sealing surface of the box member under field running and handling conditions.

Still another object of the invention is to provide a box member, as aforesaid, with a new end-of-box geometry that improves the end-of-box flat resistance to damage.

SUMMARY OF THE INVENTION

In accordance with the invention, an improved tubular connection of pin and box members defining an axis and having interengaged threads on the respective members is disclosed. The tubular connection has cooperating internal frusto-conical sealing surfaces respectively on a counterbore of the box member and a free end of the pin member. The internal sealing surface of the pin member inclining inwardly substantially at fourteen (14) degrees from the axis of the tubular connection adjacent the end of the pin member. The angle of the incline of the box internal sealing surface is substantially the same as that of the pin internal surface. The improvement comprises a pilot surface or bull nose disposed from a distal-proximate end to the distal end of the pin member inclining to a lesser extent than the angle of the incline of the internal surface of the pin member, substantially parallel to the axis of the connection; thereby defining an increased end-of-pin flat thickness.

In the preferred embodiment, the pilot surface is substantially juxtaposed to the internal sealing surface of the pin member and is parallel to the axis of the tubular connection. The new geometry of the pilot surface and therefore the increased end-of-pin thickness allows the boundary condition for a minimum thickness at the end-of-pin to be met while allowing the pin radial thickness to be decreased, thereby increasing the box radial thickness. The increased box radial thickness increases the axial tensile strength capability and burst pressure rating of the connection. The bull nose also protects the internal sealing surface of the pin member in handling. Also, the new geometry allows easier repairs of a damaged end-of-pin flat.

Further in accordance with the invention, an improved box member adapted for use in a tubular connection is disclosed. The box member is adapted for coaxial threaded engagement with a pin member. The box member has external sealing surfaces disposed on the free end of its counterbore. The external sealing surface of the box member inclines fourteen (14) degrees from the axis of the tubular connection. According to the invention, the external pilot surface disposed from a distal-proximate end to the distal end of the box member and juxtaposed to the external sealing surface of the box member inclines to a lesser extent than the angle of fourteen (14) degrees of the external sealing surface of the box member.

In the embodiment of the invention presented in this application, the external pilot surface is parallel to the axis of the tubular connection. This pilot surface or bull nose on the box member protects the external sealing surface of the box member while providing a more rugged end-of-box flat which also defines a geometry that makes repair of damage to the box end easier.

The tubular connection in the preferred embodiment has interengaged threads comprising first and second pairs of threads on the respective members, the first pair of threads being axially spaced from the second pair of threads and the first pair of threads being radially stepped with respect to the second pair of threads. A pair of shoulders on the pin and box members are disposed axially between the first and second pairs of threads.

The tubular connection may be provided with conical or crown-type sealing surfaces for the internal, external and intermediate sealing surfaces.

DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
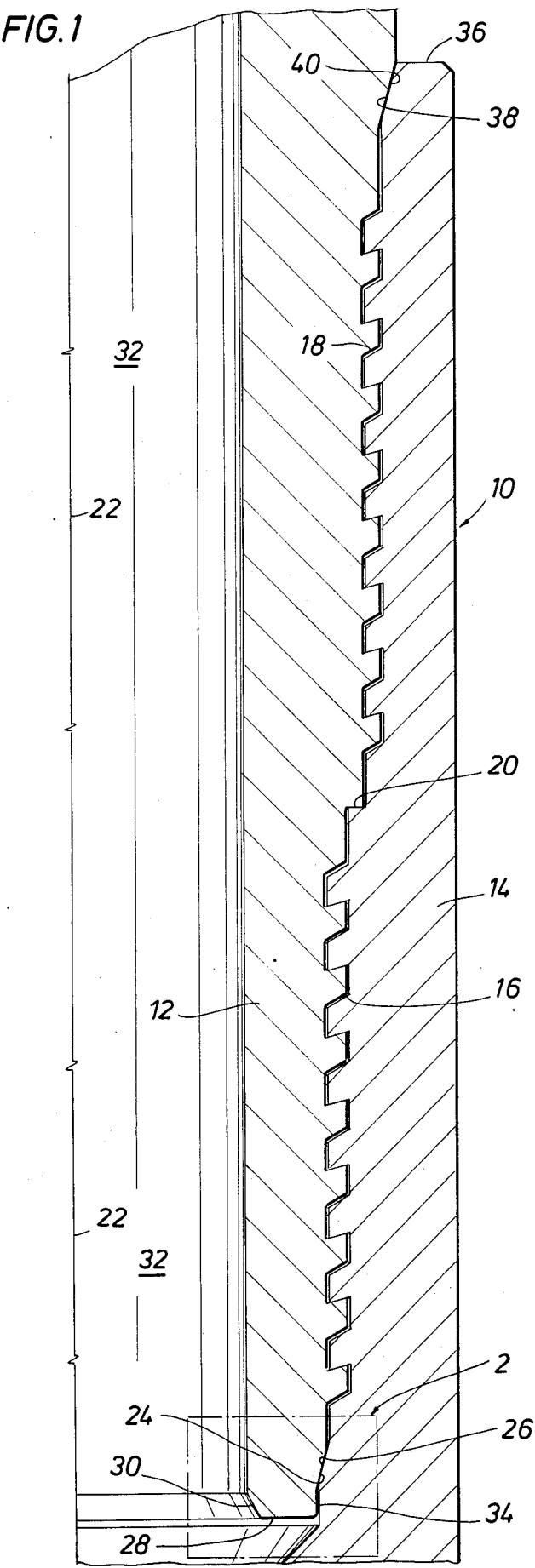
FIG. 1 is a cross-section illustration of a tubular connection according to the invention, showing the bull nose or pilot surface at the end of the pin member.
Figure 2:
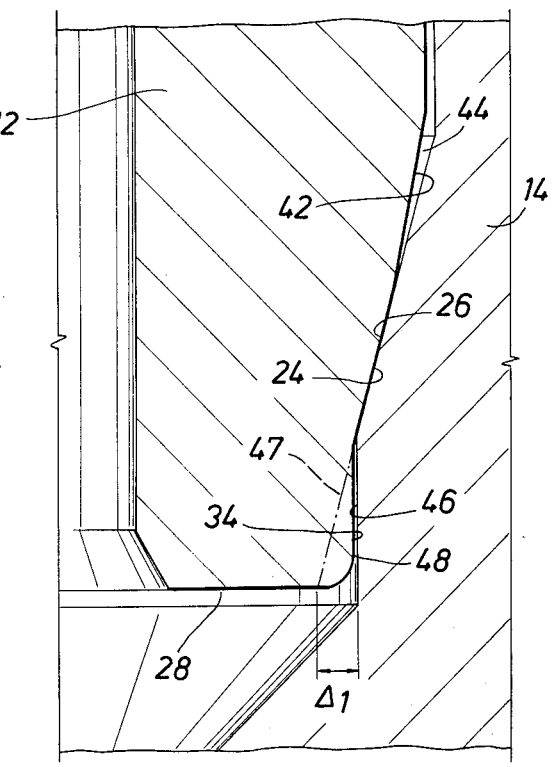
FIG. 2 is an illustration of the cooperating internal sealing surfaces and bull nose or pilot surface and further illustrates the novel geometry of the end-of-pin which provides an increased end-of-pin flat thickness.
Figure 3:
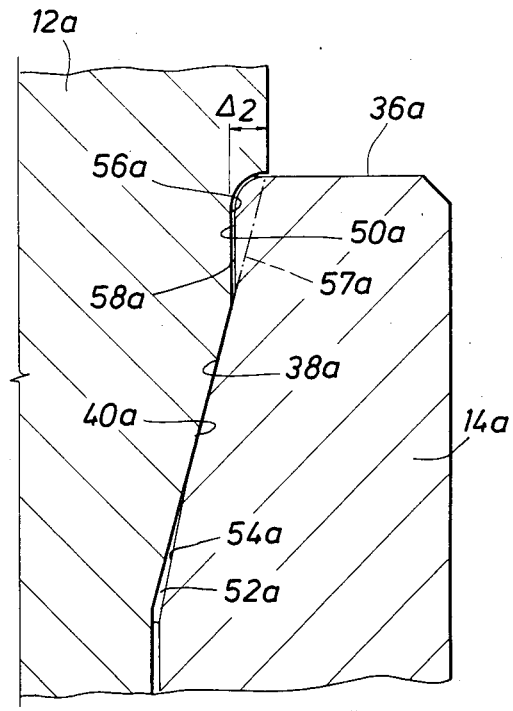
FIG. 3 is an alternative embodiment of the invention as shown in FIG. 1 in which the box member is provided with a bull nose or external pilot surface, further illustrated is the increased end-of-box flat thickness.

The tubular connection 10 embodying the improvements of the present invention is shown in detail in FIGS. 1 through 3.

Referring to FIG. 1, the tubular connection or pipe joint 10 of a pin member 12 and box member 14 is illustrated. First and second pairs of interengaged threads 16 and 18 are provided, respectively. A pair of cooperating intermediate shoulders/sealing surfaces 20 are axially disposed between the first and second pairs of interengaged threads. The pin member 12 is adapted for coaxial threaded engagement with the box member 14 whereby the axis 22 of the tubular connection is defined.

According to the invention, as illustrated in FIGS. 1 and 2, cooperating frusto-conical annular internal sealing surfaces comprise an outwardly facing internal sealing surface 24 disposed on a free end of the pin member 12 and an inwardly facing internal sealing surface 26 disposed on a counterbore of the box member 14. The pin member 12 has its end-of-pin flat 28 which is defined by the interior surface 30 of bore 32 of the tubular connection 10 and the pilot surface or bull nose 34 of the pin member 12.

According to the invention, referring to FIG. 1, box member 14 is illustrated with an end-of-box flat 36, as is well known in the prior art design of sealing surfaces and end-of-box flats. The sealing surface 38 is at an angle of incline of fourteen (14) degrees which continues to the end-of-box flat. Cooperating external frusto-conical sealing surface 40 of the pin member 12 is shown in sealing engagement with sealing surface 38 of box member 14. Note that no bull nose is shown on the external sealing surface of the box member in FIG. 1. Preferably, the internal sealing surfaces are annular frusto-conical sealing surfaces provided at substantially the same angle with respect to the axis of the connection. Typically, this angle is fourteen (14) degrees. Likewise, the cooperating external sealing surfaces 38 and 40 on the box and pin member, respectively, are also annular frusto-conical sealing surfaces provided at an angle of approximately fourteen (14) degrees.

Turning now to FIG. 2, a detailed view of the internal sealing surfaces 24 and 26 are illustrated along with the present invention of a pilot surface or bull nose 34. The pilot surface 34 is shown in the preferred embodiment as substantially parallel to the axis 22 of the tubular connection 10. This angle of incline of the pilot surface, therefore, is of a lesser extent than the fourteen (14) degree angle of incline of the internal sealing surface 24 of the pin member 12. This pilot surface provides an increased end-of-pin thickness $\Delta_1$ to the end-of-pin flat 28 over the prior art geometry design where the surface would have been defined by an angle equal to or greater than the angle of the internal sealing surface 24 as illustrated by the dashed line 47. A typical crown-type sealing surface is illustrated in FIG. 2 comprising both a sealing surface 24 and a back relief surface 42. The internal sealing surface 24 is provided with a back relief surface 42 of an angle less than the angle of the sealing surface with respect to the axis 22 of the tubular connection 10. Usually this angle is nine (9) or ten (10) degrees from the axis of the tubular connection. The back relief surface 42 provides a gap 44 between the box member 14 and pin member 12. The cooperating surface 46 of the box member is preferably not an interference fit with the pilot surface 34. A gap 48 is provided between the pilot surface 34 and cooperating surface 46.

Further in accordance with the invention, an alternative view, FIG. 3, illustrates a bull nose or external pilot surface 50a located on the free end of the box member 14. This external pilot surface 50a is substantially juxtaposed to the external sealing surface 38a of the box member 14a. The external pilot surface is disposed from distal-proximate end to the distal end of the box member 14a. The external sealing surface 38a of the box member 14a cooperates with the external sealing surface 40a of the pin member 12a. The increased end-of-box flat 36a thickness from that shown in FIG. 1 or the dashed line 57a is indicated by $\Delta_2$. A gap 52a is illustrated in FIG. 3 where the back relief 54a on box member 14a is illustrated. The angle of the back relief 54a is usually between nine (9) degrees to ten (10) degrees from the axis of the connection. The external pilot surface 50a is preferably a non-interference fit with the cooperating pin surface 56a so as to provide a gap 58a therebetween.

In the use and operation of this invention, the bull nose can be provided on the pin member or box member free end so as to provide an increased end-of-pin or end-of-box flat thickness so as to provide additional resistance to damage of the respective members sealing surfaces as well as their flats. Also, the new geometry of the pilot surfaces aids in the repair of damage over the current end-of-pin and end-of-box geometry. The current end-of-pin is difficult to field repair without damaging the internal seal or external seal. With the present invention pilot surface, the box member or pin member may be field repaired by use of a file so as not to damage the external sealing surface or internal sealing surface, respectively, because of the increased end-of-box flat 36a or increased end-of-pin flat 28, respectively. The increased flat thickness of the box member and pin member permits filing of the end surface without violating critical boundary conditions.

More importantly, pursuant to the invention, the pilot surface or bull nose of the pin member produces increased end-of-pin thickness thereby allowing the radial thickness of the pin member 12 to be reduced and still maintain the boundary condition of minimum thickness at the end of the pin in order to maintain ruggedness under field running and handling conditions. This reduction of the thickness of the pin member 12 radial allows the box member 14 radial thickness to be increased while maintaining the same overall thickness of the tubular connection. The increased box radial increases the axial tensile strength capability and burst pressure rating of the tubular connection.

Various modifications and alterations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and limitative.

What is claimed is:

1. An improved tubular connection having a pin member and a box member defining an axis, said connection having interengaged threads on the respective members and said pin member having an internal frusto-conical surface inclining inwardly towards said axis adjacent an end of the pin member and said box member having a cooperating internal frusto-conical surface with an angle of incline substantially the same as that of the internal surface of the pin member, said pin and box internal surfaces being engaged upon make-up of the tubular connection, wherein the improvement comprises, a pilot surface disposed from a distal-proximate end to a distal end of the pin member inclining to a lesser extent than said angle of incline of the engaged internal frusto-conical surfaces of the pin member and the box member thereby defining an increased end-of-pin flat thickness relative to an end-of-pin flat thickness defined by a surface inclined equal to or to a greater extent than the angle of incline of said engaged pin internal frusto-conical surface, said box member having a complementary non-engaging surface accepting said pilot surface of said pin member upon make-up of the tubular connection, whereby said pilot surface and, therefore, said increased end-of-pin flat thickness allows positioning of said interengaged threads so as to provide an increased radial thickness of said box member thereby increasing the axial tensile strength capability and burst pressure rating of said connection while also protecting said internal surface of the pin member.

2. The tubular connection of claim 1, wherein said cooperating internal frusto-conical surfaces are sealing surfaces.

3. The tubular connection of claim 1, wherein said threads comprise first and second pairs of interengaged threads on the respective members, the first pair of threads being axially spaced from the second pair of threads and the first pair of threads being radially stepped with respect to the second pair of threads.

4. The tubular connection of claim 3, including a pair of shoulders on the pin and box members disposed axially between the first and second pairs of threads.

5. The tubular connection of claim 2, wherein the angle of incline of the internal sealing surfaces is substantially 14° from the axis of the connection.

6. The tubular connection of claim 2, wherein the sealing surfaces are of a crown-type.

7. The tubular connection of claim 1, wherein said pilot surface is juxtaposed to said internal surface of said pin member.

8. The tubular connection of claim 2, wherein said pilot surface is juxtaposed to said internal surface of said pin member.

9. The tubular connection of claim 1, wherein said pilot surface is parallel to the axis of the tubular connection.

10. The tubular connection of claim 1 further comprising an external pilot surface for the box member, wherein said pin and box members have cooperating external frusto-conical surfaces, the box member having an annular inwardly facing external surface disposed on the free end of the counterbore inclining at an angle with respect to the axis of the tubular connection, the pin member having an external surface inclining outwardly from the axis of the tubular connection wherein the angle of incline of the pin external surface is substantially the same as that of the box external surface, the external pilot surface of the box member disposed from a distal-proximate end to the distal end of the free end of the box member wherein the angle inclines to a lesser extent that the angle of incline of the external surface of the box member, whereby said external pilot surface of the box member provides additional protection of said external surface of said box member and provides a rugged end-of-box flat, said external surface of said box member being positioned axially inwardly from said pilot surface of the box member.

11. The tubular connection of claim 10, wherein said external frusto-conical surfaces are sealing surfaces.

12. An improved pin member adapted for use in a tubular connection, said pin member adapted for coaxial threaded engagement with a box member having a counterbore for receiving the pin member wherein said pin member has an internal surface inclining inwardly with respect to an axis of the tubular connection adjacent an end of the pin member and an angle of incline of a cooperating internal surface of the box member is substantially the same as that of the internal surface of the pin member, said pin and box internal surfaces being engaged upon make-up of the tubular connection, wherein the improvement comprises, a pilot surface disposed from a distal-proximate end to a distal end of the pin member inclining to a lesser extent from said angle of incline of the engaged internal surfaces of the pin member and the box member, said box member having a complementary non-engaging surface accepting said pilot surface of said pin member upon make-up of the tubular connection, whereby said pilot surface allows positioning of said threads so as to provide an increased radial thickness of said box member thereby increasing the axial tensile strength capability and burst pressure rating of said tubular connection while additionally protecting said internal surface of said pin member and providing a rugged end-of-pin flat.

13. The pin member of claim 12, wherein
said cooperating internal frusto-conical surfaces are sealing surfaces.

14. The pin member of claim 12, wherein
said threaded engagement comprises first and second pairs of interengaged threads on the respective members, the first pair of threads being axially spaced from the second pair of threads and the first pair of threads being radially stepped with respect to the second pair of threads.

15. The pin member of claim 14, including
a pair of shoulders on the pin and box members disposed axially between the first and second pairs of threads.

16. The pin member of claim 13, wherein
the angle of incline of the internal sealing surface of the pin member is substantially 14° from the axis of the connection.

17. The pin member of claim 13, wherein
the sealing surfaces are of a crown-type.

18. The pin member of claim 12, wherein
said pilot surface is substantially juxtaposed to said internal surface of said pin member.

19. The pin member of claim 12, wherein
said pilot surface is parallel to the axis of the tubular connection.

20. An improved box member adapted for use in a tubular connection, said box member adapted for coaxial threaded engagement with a pin member, said members having cooperating external frusto-conical surfaces, the box member having disposed on a free end of a counterbore an annular inwardly facing external sealing surface inclining at an angle with respect to an axis of the tubular connection, the pin member having an external sealing surface inclining inwardly, the angle of incline of the box external surface being substantially the same as that of the pin external surface, the pin and box external sealing surfaces being engaged upon make-up of the tubular connection, wherein said improvement comprises, an external pilot surface disposed from a distal-proximate end to a distal end of the box member inclining to a lesser extent than the angle of incline of the external surface of the box member, the pin member having a complementary non-interference surface cooperating with said external pilot surface of the box member, whereby said external pilot surface protects said external surface of said box member and provides a rugged end-of-box flat, said external surface of said box member being positioned axially inwardly from said pilot surface of the box member.

21. The tubular connection of claim 20, wherein
said threaded engagement comprises first and second pairs of interengaged threads on the respective members, the first pair of threads being axially spaced from the second pair of threads and the first pair of threads being radially stepped with respect to the second pair of threads.

22. The tubular connection of claim 21, including
a pair of shoulders on the pin and box members disposed axially between the first and second pairs of threads.

23. The tubular connection of claim 20 wherein
the angle of incline of the external sealing surfaces is substantially 14° from the axis of the connection.

24. The tubular connection of claim 20, wherein
the sealing surfaces are of a crown-type.

25. The tubular connection of claim 20, wherein
said external pilot surface is juxtaposed to said external sealing surface of said box member.

26. The tubular connection of claim 20, wherein
said external pilot surface is parallel to the axis of the tubular connection.

27. An improved tubular connection having a pin member and a box member defining an axis, the connection having first and second pairs of interengaged threads on the respective members, the first pair of threads being axially and radially spaced from the second pair of threads, the pin member having an internal frusto-conical sealing surface inclining radially inwardly towards the axis adjacent an end of the pin member, the box member having a cooperating internal sealing surface engaged with the pin sealing surface upon make-up of the connection, wherein the improvement comprises, a pilot surface disposed axially outwardly from the internal surface of the pin member to a distal end of the pin member inclining to a lesser extent than said internal sealing surface of the pin member thereby defining an increased end-of-pin flat thickness, the box member having a complementary non-engaging surface accepting said pin pilot surface, whereby said pilot surface and, therefore, said increased end-of-pin flat allows positioning of the first and second pairs of threads to provide an increased radial thickness of the box member thereby increasing the axial tensile strength capability and burst pressure rating of the connection while protecting the internal sealing surface of the pin member.

* * * * *